Jan. 24, 1956
G. M. MARECHAL, JR
2,732,207
ILLUSION APPARATUS
Filed May 26, 1952
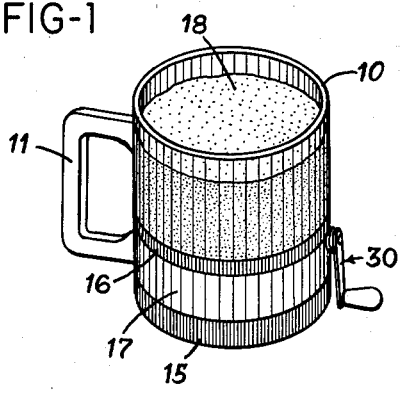
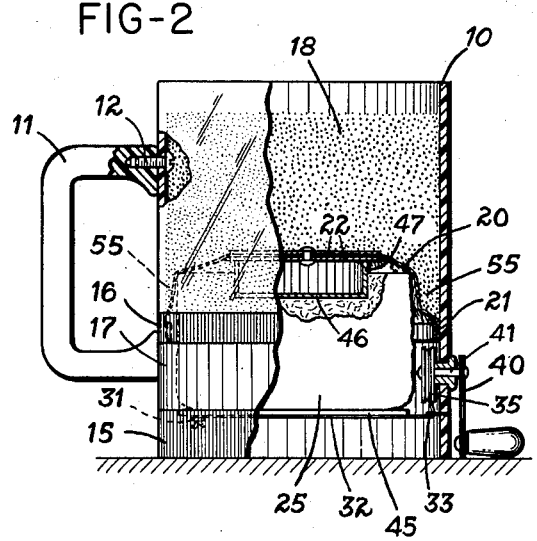
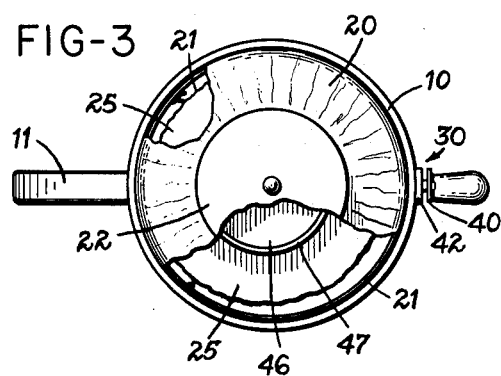
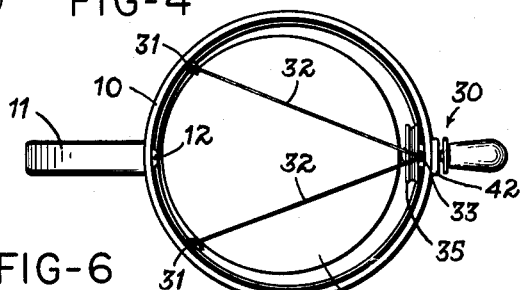
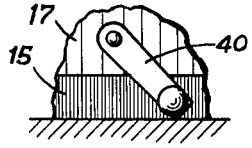
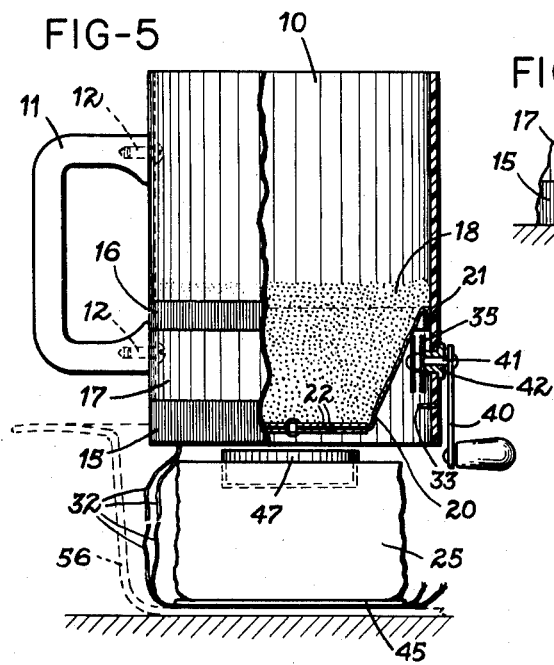
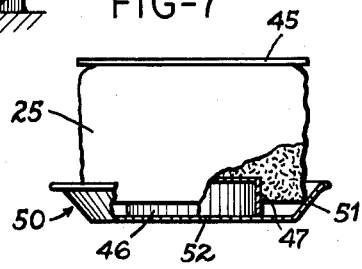
INVENTOR.
GREER M. MARÉCHAL, JR.
BY
Maréchal Biebel French Bugg
ATTORNEYS

United States Patent Office 2,732,207
Patented Jan. 24, 1956

2,732,207
ILLUSION APPARATUS
Greer M. Maréchal, Jr., Dayton, Ohio

Application May 26, 1952, Serial No. 290,012

7 Claims. (Cl. 272—8)

This invention relates to illusion apparatus for magicians and other entertainers for performing a so-called magic or conjuring trick or illusion and more particularly to apparatus for secretly introducing bulky objects into a hat or other empty container.

Magicians and like entertainers are frequently called upon to perform a conjuring trick or illusion in which a cake, a number of cookies, or the like, are apparently baked in a hat, or like container, borrowed from a member of the audience. In the course of such a trick or illusion, flour, eggs, milk, and other ingredients of a cake are visibly introduced into a borrowed hat in such manner as to give the effect of mixing in the hat a messy batter. Thereafter a completely baked cake or a number of cookies, etc., is visibly removed from the hat, and the hat returned to its owner undamaged, the messy batter apparently having been magically converted into the cake or cookies without damage to the borrowed hat.

It will be understood that, in order to perform such an illusion, means are provided for receiving and disposing of any messy batter ingredients actually introduced into the borrowed hat so as to protect the hat from damage. Also means are provided for secretly or invisibly introducing into the hat a previously baked cake or cookies, etc. It will also be understood, that, unless the cake is introduced into the hat and the batter removed therefrom without arousing the suspicions of the audience and in a manner which precludes any detection of such action by the audience, the illusion itself will not be as effective, entertaining, or mysterious as desired.

According to the present invention, there is provided apparatus simulating a utensil which might conventionally and unsuspiciously be used in connection with baking a cake—e. g., a flour sifter. Such apparatus is constructed, however, so that there may be hidden therein the cake or cookies which it is desired secretly to introduce into the hat, and so that such cake or cookies can be secretly or invisibly introduced into the hat while the performer apparently is merely putting the utensil to its conventional use—e. g., sifting flour—and without visibly inserting the utensil or any other container into the hat.

It is accordingly a principal object of this invention to provide illusion apparatus of the character described for secretly introducing a hidden object into an empty container while apparently using such apparatus for some other purpose and without visibly introducing such apparatus into the empty container.

It is a further object of this invention to provide illusion apparatus of the character described for hiding and secretly introducing into a container, such as a hat or the like, a hidden object, such as a cake or the like, while giving the illusory appearance of introducing into said container a different visible object, such as a quantity of flour or the like, but not actually introducing such visible object.

A still further object of the present invention is to provide illusory apparatus of the character described simulating the appearance of a flour sifter and adapted to hide therein an object such as a cake to be introduced into an empty container such as a hat, such apparatus being constructed so that, when the simulated flour sifting mechanism is operated, it will appear that flour is being released into the hat, but actually the hidden cake will be released into the hat and no flour will actually be so released.

Still another object of this invention is to provide illusion apparatus of the character described simulating in appearance a transparent flour sifter appearing to be substantially full of flour and adapted to contain in a hidden compartment a cake or the like so that the presence of the cake in the transparent flour sifter is obscured by the flour therein, and having simulated flour sifting mechanism operable to release the cake from its secret compartment and simultaneously cause the quantity of flour visible in the transparent sifter apparently to decrease without actually releasing any of the flour from the sifter.

A still further object of this invention is to provide illusion apparatus of the character described which will secretly introduce into an empty hat or like container a receptacle for receiving messy batter visibly introduced into the hat and for protecting the hat from damage by such messy batter.

It is another object of this invention to provide a method for performing a magic trick or illusion of the character described in which a cake or the like is secretly introduced into a hat or the like while apparently visibly introducing a quantity of flour or the like into the hat and, at the same time, a receptacle is also secretly introduced into the hat for receiving and protecting the hat from damage by messy batter components, thereafter eggs, milk, and other batter components are apparently introduced into the hat, such components being subsequently enclosed in such receptacle to protect the inside of the hat therefrom, and then the enclosed receptacle is secretly removed from the hat and the cake visibly removed from the hat as if it had been baked in the hat from such batter components.

Still a further object of this invention is to provide means and apparatus for performing such a magic trick or illusion of the character described.

Other objects and advantages of this invention will be apparent from the following description, the accompanying drawings and the appended claims.

In the drawings, in which like reference numerals designate like elements throughout the several views—

Fig. 1 is a perspective view of an apparatus embodying and for performing this invention in the form of simulated transparent flour sifter containing flour;

Fig. 2 is a view partially in section showing the internal construction of such apparatus as it appears at the start of the illusion with a cake hidden in place;

Fig. 3 is a top view of the simulated flour sifter of Fig. 2 with the flour removed therefrom and showing the cake in starting position;

Fig. 4 is a bottom view of the flour sifter of Fig. 2;

Fig. 5 is a view partially in section of the flour sifter of Fig. 1 after the illusion has been completed and the cake has been introduced into the hat;

Fig. 6 is a detail view showing the locking mechanism for maintaining the cake hidden within the apparatus before use; and Fig. 7 is a view partially in section showing the cake after the illusion and as it is presented to the view of the audience.

Referring to the drawings, which illustrate now preferred embodiments of the invention, the apparatus is constructed to simulate in appearance a transparent flour sifter. It will be understood that the more conventional appearing the apparatus, the less it will arouse suspicions of the spectators. As shown, the main body of the apparatus comprises a hollow cylinder 10 without top or bottom and preferably made of a rigid transparent plastic. To cylinder 10 is affixed a conventional handle 11 by means of bolts 12.

An opaque stripe 15 encircles the bottom end of cylinder 10 apparently merely for the purpose of decoration, although actually to render the bottom portion of cylinder 10 nontransparent. Another opaque stripe 16 encircles cylinder 10 approximately one-third of the way up from the bottom. This stripe 16 is also apparently merely for decorative purposes, but actually its purpose is to obscure the top portion of a secret compartment described below and to render the cylinder 10 nontransparent at this point. The area 17 of the cylinder 10 between the stripes 15 and 16 is opaque and colored to match the flour 18 contained in the upper portion of cylinder 10. That is, since the upper portion of cylinder 10 is transparent, flour contained therein will be visible through the cylinder and will give the cylinder a white color. Painting or otherwise coloring the area 17 between stripes 15 and 16 white renders this area of the cylinder nontransparent, and yet it will appear that this area 17 is actually transparent and that its white color comes from flour contained therein simulating the appearance of the transparent portion of cylinder 10 above stripe 16.

A flexible or movable partition 20 is secured around the inside circumference of cylinder 10 at 21. This juncture 21 of partition 20 with cylinder 10 is aligned with and obscured by stripe 16. Partition 20 may be of cloth or other suitable material cut in the form of a circle of such diameter that partition 20 may be raised or lowered within cylinder 10 from the position shown in Fig. 2 to the position shown in Fig. 5. Discs 22 are affixed to the center portion of flexible partition 20 to provide a non-flexible center area thereon. The diameter of stiffening discs 22, and of flexible partition 20 and the location of joint 21 between partition 20 and the cylinder 10 are all correlated dimensionally so that, when partition 20 is distended downwardly by a quantity of flour contained therein (as in Fig. 5), discs 22 will not extend below the bottom of cylinder 10, and, similarly, when partition 20 is extended upwardly of joint 21 (as in Fig. 2), there will be sufficient slack in partition 20 for the nonconstricting enclosure of a cake 25 as shown in Fig. 2 entirely above the bottom of cylinder 10. With cake 25 in the position shown in Fig. 2, partition 20 is held in its raised position by discs 22 resting on the cake.

The operating mechanism for the apparatus includes windlass 30, eyelets 31, and threads 32. Threads 32 are fine twisted black silk threads of a size large enough to safely hold the weight of cake 25, which threads are sufficiently fine as to be substantially unnoticed by the audience at a short distance under normal conditions of performing the illusion even when the threads are in view of the audience. One end of each of threads 32 is affixed to eyelets 31 on the side of cylinder 10 opposite from windlass 30. Threads 32 run from eyelet 31 to eyelet 33, thus forming a triangular support for cake 25 as shown in Fig. 4. Threads 32 meet at eyelet 33, are threaded therethrough, and are both wound around drum 35 of windlass 30. The threads 32 are not permanently fastened or knotted to the drum 35, but are merely wound thereon. Drum 35 is connected with crank 40 by shaft 41 passing through bearing 42 in the side of cylinder 10 so that operation of crank 40 turns drum 35 and thus winds up or unwinds threads 32 depending upon the direction of rotation. Crank 40 is of such length, as shown in Figs. 5 and 6, that it extends below the bottom of cylinder 10 thereby providing a simple and effective brake action. That is, when cylinder 10 is sitting on a table, as in Fig. 6, the end of crank 40 will rest on the table and its length precludes unwinding of the windlass 35 while the apparatus rests on the table.

The cake 25 may be of any description but is of a diameter sufficiently small to be readily introduced into a borrowed hat or what ever other container with which it is desired to perform the illusion. As introduced into the illusion apparatus (Fig. 2) the cake is upside down and resting upon a cardboard disc 45 to preclude threads 32 from cutting into the cake itself. On the upturned bottom of cake 25 rests circular receptacle 46, the diameter of which is somewhat less than the diameter of discs 22 on flexible partition 20. Receptacle 46 is preferably inset somewhat into the bottom of cake 25. The height of the sides 47 of receptacle 46 may satisfactorily be of the order of ½ to ¾ of an inch.

In addition to the apparatus above described, a small metal or paper pie plate 50 is provided of such diameter as will conveniently receive cake 25. The diameter of pie plate 50, the height of its side walls 51 and the angle between the side walls 51 and the bottom 52 thereof are all dimensionally coordinated with the diameter of receptacle 46 and the height of the side walls 47 thereof so that, when the cake 25 is inverted and placed upon pie plate 50—as shown in Fig. 7—the flat bottom 52 of plate 50 will cover receptacle 46 against spilling the contents thereof and the sides 51 of plate 50 will meet the bottom of cake 25 so as to completely obscure and hide the presence of receptacle 46.

In preparing to present the illusion, the cake 25 is inverted on cardboard disc 45 and receptacle 46 inserted into the upturned bottom of cake 25. The cake is then inserted, with receptacle 46 uppermost, into the bottom of cylinder 10. Threads 32 are passed beneath cardboard disc 45 and are threaded through eyelet 33 and wound upon drum 35 by turning crank 40. The apparatus is then set upright on a convenient table, the length of crank 40 precluding the weight of cake 25 from unwinding drum 35. A quantity of flour 18 is introduced into the top of cylinder 10 substantially filling the cylinder. This flour is visable through the transparent walls of cylinder 10 and fills spaces 55 around the cake 25 but is separated from the cake by flexible partition 20. With the apparatus as shown in Fig. 2, the illusion is ready for performance.

In preforming the illusion, a hat 56 or like container is borrowed from a member of the audience, is shown to be empty, and is placed crown downwards on the table. After announcing his intention to bake a cake in the hat, the performer picks up the simulated sifter apparatus by grasping the handle 11 with one hand and, simultaneously, crank 40 with the other hand to preclude its unwinding. The apparatus is held over the hat with the bottom of cylinder 10 barely obscured by the hat brim. Crank 40 is then operated in the manner of a similar crank on a conventional flour sifter, thus giving the illusion that the performer is merely sifting flour into the hat. Actually crank 40 is operated so as to unwind drum 35 thereby gradually releasing threads 32.

As threads 32 are loosened, the weight of cake 25 causes it gradually to descend invisibly into the hat. The descent of cake 25 allows disc 22 and flexible partition 20 also to descend thereby gradually and visibly lowering the level of flour in the top portion of the sifter and thus enforcing the illusion that flour is actually being sifted into the hat by the operation of crank 40. When the threads 32 are completely unwound from drum 35, cake 25 will be resting on the inside of the hat 56 and disc 22 and flexible partition 20 will be in its lowermost position with the bulk of the flour in the sifter occupying substantially the space in cylinder 10 formerly occupied by the cake—all as shown in Fig. 5. The quantity of flour originally introduced into the sifter is sufficient so that, in the position shown in Fig. 5, there will still be some flour visible through the transparent cylinder 10 above stripe 16.

The sifter is then lifted straight upwardly away from the hat 56 and is set aside on the table. This motion pulls threads 32 free of the cake, since one end of the threads has been released from drum 35. The small size and black color of threads 32 will render them substantially invisible as they dangle momentarily from the bottom of cylinder 10 during this lifting motion. The cake is now resting upside down in hat 56, as shown in Fig. 5, with receptacle 46 uppermost.

Having secretly and invisibly introduced the cake 25 and receptacle 46 into the hat, the performer may then appear to add such other supposed ingredients as may be desired, either actually pouring eggs, milk, etc., into receptacle 46 or merely simulating such actions in well-known manner by using well-known illusion apparatus. Any such actually added ingredients can be mixed in receptacle 46 to provide messy batter some of which can be shown to the audience on the mixing spoon, etc.— all to enhance the illusion of having introduced a messy batter into the borrowed hat.

Thereafter the performer purports to cause the baking to occur with such appropriate by-play or showmanship as may be desired. When the baking process has been supposedly completed, the performer grasps pie plate 50 by its bottom, places it upside down over receptacle 46, and then inverts the hat 56 and cake 25, and removes the hat to disclose the cake resting on pie plate 50 in the performer's hand. This sequence of operations produces the arrangement shown in Fig. 7 with the cake upright on pie plate 50 and the contents of receptacle 46 enclosed and the receptacle itself hidden within pie plate 50. The cardboard disc 45 is simply discarded, and the cake can be cut, passed out to the spectators, and eaten as desired.

Instead of utilizing a cake, it will be understood that a stack of large cookies or a quantity of candy or small cookies enclosed within a paper or cloth bag (which bag is simply left within hat 56 to be secretly disposed of later) or other objects can readily be substituted with, of course, appropriate changes in the various ingredients apparently introduced into the hat. Similarly, as will be understood by those skilled in the art, receptacle 46 may be omitted as well as the actual (as opposed to apparent or simulated) introduction of batter ingredients into the hat. Instead of flexible partition 20, a telescoping cylindrical member or sliding transverse partition may be used.

From the foregoing description it will be understood that this invention provides a device and method for performing a magic or conjuring illusion of the character described with ease of operation either for those skilled in the art of professional entertaining or such amateur hobbyists as may find enjoyment from the mastery and performance of so-called magic tricks or illusions and, further, which apparatus and method possess features heretofore unknown for enhancing the mysterious accomplishment of the illusion and for minimizing the possibility of the true method or modus operandi being deduced by the audience to the embarrassment of the performer and to the detriment of the entertainment value of the illusion.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An illusion device of the character described for secretly releasing a hidden object while giving the illusory appearance of releasing a different visible object comprising in combination a container for both said hidden and said visible objects, means for rendering said visible object visible while within said container, means for maintaining said hidden object in said container hidden from view, means for secretly releasing said hidden object from said container, and means cooperating with said releasing means for apparently releasing said visible object from said container while actually retaining said visible object in said container at least partially hidden from view.

2. Illusion apparatus of the character described for secretly depositing a hidden object in a designated location while giving the illusory appearance of depositing a different visible object in said location comprising in combination a container adapted to simulate the appearance of a flour sifter, said container being open at both ends and at least the upper portion of said container being substantially transparent, a movable partition transversely of said container dividing said container into an upper visible chamber and a lower chamber, means for releasably suspending said hidden object within said lower chamber with said partition in a raised position, means for suspending said visible object in said upper visible chamber, and means for releasing said suspended hidden object from said lower chamber, said releasing means including means for simultaneously lowering said movable partition and said visible object at least partially below said transparent portion and into the space in said container occupied by said hidden object prior to the release thereof.

3. Illusory flour sifter apparatus of the character described comprising an upper flour containing chamber having transparent sides, a lower hidden chamber having substantially opaque sides, a flexible partition separating said upper chamber from said lower chamber, said partition being hidden from view by flour in said upper chamber, means for releasably suspending an object within said lower chamber hidden from view with said partition in a raised position, means simulating the operating mechanism of a flour sifter for lowering said hidden object from said hidden chamber, and means for lowering said flexible partition and said flour simultaneously with said hidden object for effecting removal of flour from said upper chamber to occupy space previously occupied in said lower chamber by said hidden object.

4. In illusory flour sifter apparatus of the character described comprising a container simulating a flour sifter with transparent sides, a movable transverse partition dividing said sifter into an upper chamber having transparent sides and adapted to contain a quantity of flour visible through said transparent sides and a lower hidden chamber having substantially opaque walls and adapted to contain a hidden object, means for raising and lowering said partition to vary the size of said upper chamber, means for releasably suspending said hidden object within said lower chamber beneath said partition, means for lowering said hidden object from said hidden chamber, said partition-lowering means cooperating with said object-lowering means for simultaneously lowering said partition effecting lowering of the visible level of said flour in said upper chamber.

5. Illusion apparatus of the character described comprising a container open at the top and bottom thereof, a movable partition transversely dividing said container into upper and lower chambers of variable sizes, transparent side walls in said upper chamber, opaque side walls in said lower chamber, means for releasably suspending a hidden object in said lower chamber with said partition in a raised position, windlass means for lowering said hidden object from said lower chamber, operating means for said windlass means including means for locking said windlass means against operation in a variety of positions thereof, lowering means also operated by said windlass operating means for lowering said movable partition to enlarge said upper chamber while diminishing said lower chamber.

6. Illusion apparatus of the character described comprising in combination a container adapted to simulate the appearance of a flour sifter and open at the top and bottom thereof, a movable partition transversely dividing said container into upper and lower chambers, means for releasably suspending a hidden object and a receptacle in said lower chamber with said partition in a raised position, windlass means for lowering said hidden object and said receptacle out of said lower chamber, means for locking said windlass means against operation in a variety of positions, and means for lowering said movable partition to enlarge said upper chamber and diminish said lower chamber.

7. An entertainment device adapted for creating the illusion of mixing and baking a cake in a hat comprising in combination a shell in the form of a flour sifter, a transparent upper portion in said shell, an opaque lower portion in said shell, the surface of said opaque lower portion being treated to create the illusion that flour is contained therein, a movable partition within said shell for separating said upper and lower portions, an opaque decorative band on the outside of said shell for concealing the juncture of said transparent and opaque portions, a releasable support at the bottom of said shell for retaining said cake within said shell in starting position, a container engaging the bottom of said movable partition and adapted to be supported by said cake in said starting position for maintaining said movable partition substantially above said juncture between said transparent and opaque portions, means including a windlass for gradually releasing said releasable support and for lowering said cake and said container out of said shell through the bottom thereof, operating means for said windlass in a form simulating the operating means of a flour sifter and including means for locking and maintaining said windlass and said releasable support in said starting position with said cake completely within said shell, said gradual releasing and lowering of said cake and container out of said shell effecting simultaneous lowering of said movable partition to a position substantially below said juncture of said transparent and opaque portions.

References Cited in the file of this patent

UNITED STATES PATENTS

| | | |
|---|---|---|
| 1,127,520 | Rosen | Feb. 9, 1915 |
| 2,590,279 | Soss | Mar. 25, 1952 |

OTHER REFERENCES

"Magic" (Hopkins), published by Munn & Co. New York, 1906 (pages 117–119 cited as of interest).